United States Patent
Kocho

(10) Patent No.: US 7,978,215 B2
(45) Date of Patent: Jul. 12, 2011

(54) SYSTEM USING MOBILE DEVICE FOR SETTING UP AND ACTIVATING AGENT SHORTCUT OPERATIONS TO CONTROL ELECTRONIC DEVICE AT REMOTE LOCATIONS

(75) Inventor: Keith Kocho, Scarborough (CA)

(73) Assignee: Cisco Technology, Inc., San Jose, CA (US)

( * ) Notice: Subject to any disclaimer, the term of this patent is extended or adjusted under 35 U.S.C. 154(b) by 1424 days.

(21) Appl. No.: 10/721,071

(22) Filed: Nov. 26, 2003

(65) Prior Publication Data

US 2005/0114483 A1    May 26, 2005

(51) Int. Cl.
*H04N 7/173* (2011.01)
(52) U.S. Cl. ............... 348/14.05; 348/734; 340/825.72; 340/825.76
(58) Field of Classification Search ........... 700/65; 725/133, 42, 112; 715/733; 709/203, 208; 705/7; 348/14.05, 734; 340/825.72, 825.76; 455/3.03
See application file for complete search history.

(56) References Cited

U.S. PATENT DOCUMENTS

| | | | |
|---|---|---|---|
| 6,198,479 B1 * | 3/2001 | Humpleman et al. | 715/733 |
| 2002/0035404 A1 * | 3/2002 | Ficco et al. | 700/65 |
| 2002/0083128 A1 * | 6/2002 | Miyajima et al. | 709/203 |
| 2002/0174444 A1 * | 11/2002 | Gatto et al. | 725/133 |
| 2003/0115602 A1 * | 6/2003 | Knee et al. | 725/42 |
| 2003/0140107 A1 * | 7/2003 | Rezvani et al. | 709/208 |
| 2004/0031058 A1 * | 2/2004 | Reisman | 725/112 |
| 2004/0044553 A1 * | 3/2004 | Lambert et al. | 705/7 |

* cited by examiner

*Primary Examiner* — Le Luu
(74) *Attorney, Agent, or Firm* — Patent Capital Group

(57) ABSTRACT

Embodiments of the present invention provide for methods, devices and systems for setting up an agent shortcut operation to be activated at an electronic device in a network. The agent shortcut operation can be setup at an electronic device connected to a network by receiving a selection of an agent shortcut operation from a user on an agent setup device, and sending the selected agent shortcut operation through the network to the electronic device to be available for subsequent activation. The agent shortcut operation can be activated by sending an agent shortcut operation to the electronic device, receiving an activation signal from an agent activation device for the agent shortcut operation, and in response to the received activation signal, sending a signal to the electronic device to activate the agent shortcut operation.

54 Claims, 4 Drawing Sheets

SYSTEM USING MOBILE DEVICE FOR SETTING UP AND ACTIVATING AGENT SHORTCUT OPERATIONS TO CONTROL ELECTRONIC DEVICE AT REMOTE LOCATIONS

TECHNICAL FIELD

The present invention relates to a system and method for setting up and activating of agent shortcut operations. More specifically, the present invention relates to such a system and method for setting up and activating of agent shortcut operations for use in network-connected electronic devices.

BACKGROUND INFORMATION

Electronic devices used today often have complex graphic user interfaces. To perform a function, such as setting device preferences, parental controls, setting recording or tuning options, playing music in a specified order, etc., a user is often presented with one or a series of complex screens to make selections from.

However, as the available options to a user become more numerous and complex, a user may have difficulty in navigating through the numerous screens and choices that are presented. For example, if the device is a set top box in a cable television system, a user may have multiple set top boxes in different locations, and the user may want to make different selections for each of them. The different set top boxes may be set up with different parental control settings, different recording selections, etc. Additionally, the user may want to change such settings on occasion, and may forget to do so or want to do so from a remote location.

Accordingly, what is needed is a way to control and manipulate such settings to be more easily used. Additionally, it would be beneficial if such settings could be controlled and set from a remote location.

SUMMARY OF THE INVENTION

Embodiments of the present invention provide for methods, devices and systems for setting up an agent shortcut operation, and for executing and/or activating an agent shortcut operation on an electronic device in a network.

The agent shortcut operation can be setup at an electronic device connected to a network by receiving a selection of an agent shortcut operation from a user on an agent setup device, and sending the selected agent shortcut operation through the network to the electronic device to be available for subsequent activation. The agent shortcut operation can be activated by sending an agent shortcut operation to the electronic device, receiving an activation signal from an agent activation device for the agent shortcut operation, and in response to the received activation signal, sending a signal to the electronic device to activate the agent shortcut operation.

DETAILED DESCRIPTION

Embodiments of the present invention provide for methods, devices and systems for the setup, configuration, activation and execution of agent shortcut operations. The present invention is particularly useful when used with a network connected device, as further explained below.

The agent shortcut operations are a series of discrete instructions combined into a instruction set, that enable the user to easily carry out an operation or operations defined in the agent shortcut operation. The instruction set may be complex.

Figure 1:
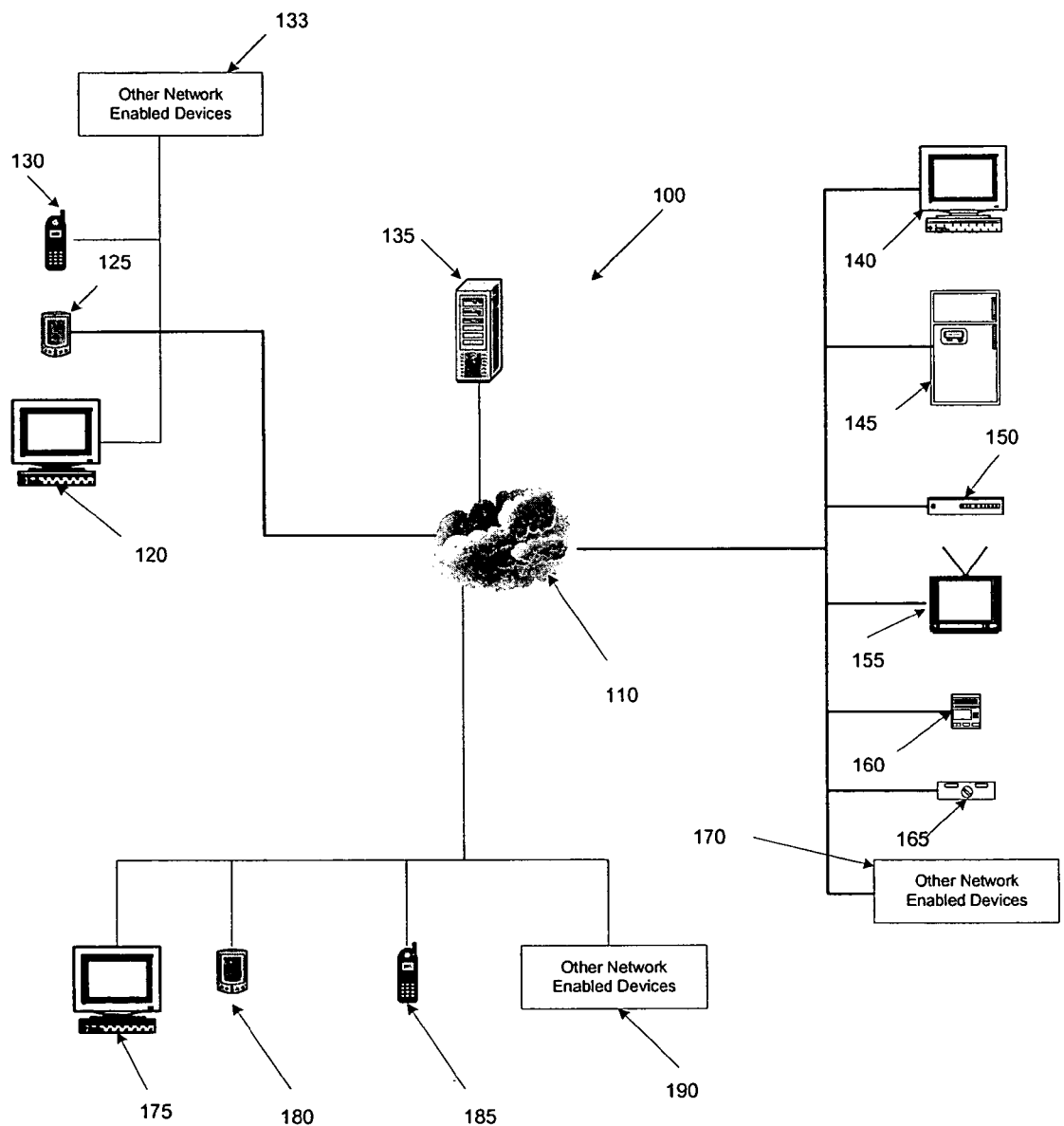
FIG. 1 is a block diagram of an embodiment of the present invention.

FIG. 1 depicts a block diagram of an embodiment of the present invention. System 100 includes various elements that may function to allow the setup, configuration, activation and execution of an agent shortcut operation or operations, as further explained below.

System 100 may include a network 110. Network 110 may be a local area network (LAN) or a wide area network (WAN). The system 100 may be used in any environment, including a home environment or a business environment.

The network 110 may be connected to one or more Agent Setup Devices, such as a computer 120, a personal data assistant 125, a phone 130, and/or another network connected device 133. The connection of Agent Setup Devices may be a wired connection or a wireless connection, and may include any conventional or non-conventional connection method, including but not limited to dialup, cable, satellite, wireless, DSL, cable modem, infrared, Ethernet, etc. The Agent Setup Devices may be used to setup and/or configure agent shortcut operations, as further discussed below.

Also connected to network 110 are one or more Agent Managed Devices on which the agent shortcut operations are to be executed. The present invention may include only one of these devices or any number of these devices on which the agent shortcut operations are to be executed. For example, the device on which the agent shortcut operation is to be executed may be a computer 140, a refrigerator 145, an x10 controller 150, a television 155 (which may include a set top box), a home alarm or alarm system 160, a thermostat 165, and/or another network connected device 170. Any electronic device that can be connected to a network can function with the present invention.

For example, the network connected device 170, which may be connected in a wired or wireless manner. The network connected device 170 may be a personal data assistant, a computer, a phone, or a gaming console for a video game system, or any other network connected electronic device.

Also connected to network 110 are one or more Agent Activation Devices. The present invention may include only one of these devices or any number of these devices on which the agent shortcut operations are to be activated. For example, the device on which the agent shortcut operation is to be activated may be a computer 175, a personal data assistant 180, a phone 185, and/or another network connected device 190. Any electronic device that can be connected to a network can function with the present invention.

The present invention may be used to setup and/or configure agent shortcut operations on an Agent Setup Device connected to the network 100. The present invention may also be used to allow a user to select one or more agent shortcut operations on an Agent Activation Device connected to the network, where the agent shortcut operations are transferred or sent to the Agent-Managed Device connected to the network, for subsequent execution on the Agent-Managed Device.

The system 100 may also include a server 135 that may be used to store and/or relay agent shortcut operations, and to provide menus to the user in accordance with the present invention. The server 135 may be at a same physical location as any of the devices and network 110, or may be at a different location. For example, if system 100 is a system for use in the home, server 135 could be located in the home, or be located at a different location. The server 135 may be owned by an entity that the user subscribes to, such as a cable company or ISP (Internet Service Provider). The user may be able to setup, configure and activate the agent shortcut macros by connecting to the server 135, where the server 135 provides graphics to the user, as further explained below.

Figure 2:
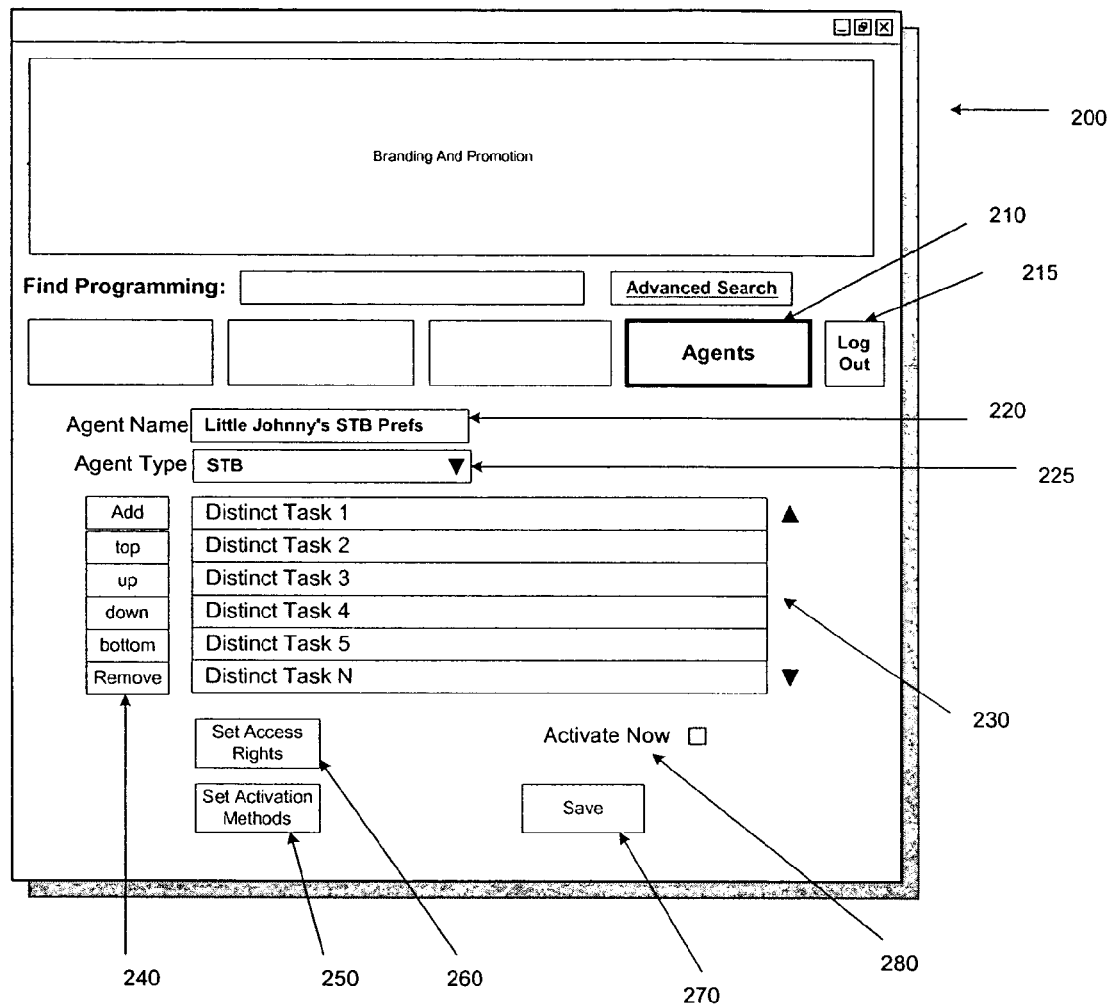
FIG. 2 is a diagram illustrating a screen shot that may be used in accordance with embodiments of the present invention.

FIG. 2 illustrates a screen shot 200 that may be used in accordance with embodiments of the present invention. This and subsequent screenshots shown herein are only examples on numerous variations that could be used with the present invention. The user may be able to access the screen shot 200 on an Agent Setup Device such as devices 120-133 shown in FIG. 1, for example. The user may access screen shot 200 by logging onto a particular website and entering a password, for example.

Screen shot 200 also includes an Agents portion 210, which may be selected to set up agents and agent shortcut operations. Log out portion 215 may be selected to log out. Agent name portion 220 may be used to name agent shortcut operations. Agent type portion 225 may be used to set an agent type, such as STB (set top box).

Agent shortcut operation portions 230 are used to set up agent shortcut operations. Distinct tasks 1-N are shown in FIG. 2. Any type of task may be used. For example, the distinct task 1 could be to set the home alarm at 9:00, distinct task 2 could be to turn on outside lights at 7:00, distinct task 3 could be to set parental control level 3 on STB 1 at 4:00, and so forth. Control portions 240 allow manipulation of the agent shortcut operations, by adding, removing and moving within the agent shortcut operations.

The set activation method portion 250 allows the user to set the method of activation of the agent shortcut operations, to set how the agent shortcut operations will be activated. For example, this will allow the user to select Agent Activation Devices which will be allowed to activate the agent shortcut operations, such a computer 175, a personal data assistant 180, a phone 185, and/or another network connected device 190, as further described below. The set access rights portion 260 is used to allow the user to set particular actors who will be able to activate the agent shortcuts. For example, a user may want adult members of her family to be able to activate the agent shortcut operations, but to prohibit the minors in her family from doing so.

The save portion 270 lets a user save entries that have been made. The activate now portion 280 allows the user to have agent shortcut operations entered in the agent shortcut operation portion 230 activated immediately on the Agent-Managed Device.

Figure 3:
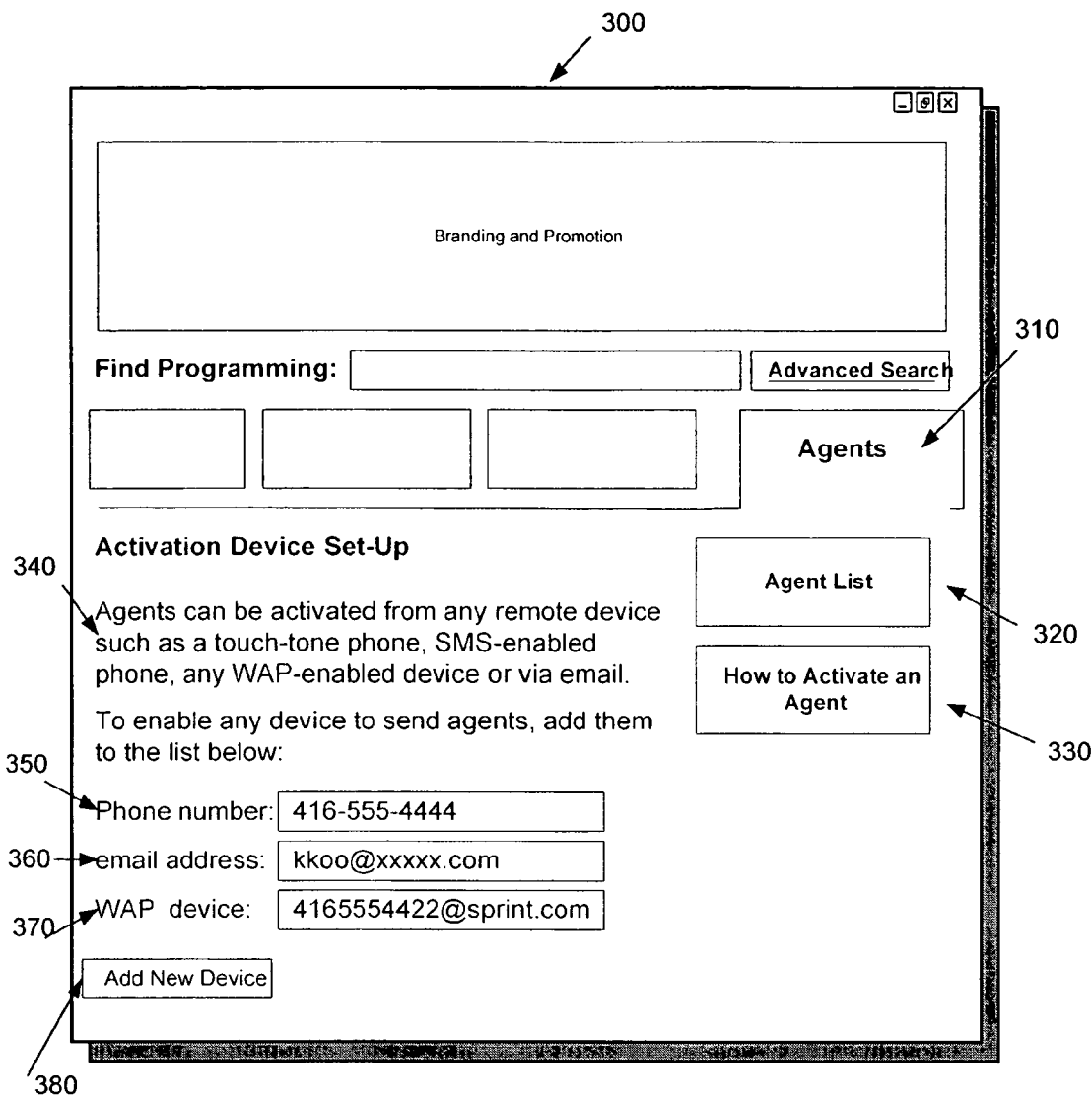
FIG. 3 is a diagram illustrating a screen shot that may be used accordance with an embodiment of the present invention.

FIG. 3 illustrates a screen shot 300 that may be used in accordance with embodiments of the present invention. The user may be able to access the screen shot 300 on an Agent Setup Device, such as devices 120-133 shown in FIG. 1, for example. The user may access screen shot 300 by logging onto a particular website and entering a password, for example.

Screen shot 300 also includes an Agents portion 310. Agent List portion 320 may be selected to display an agent list of currently set up agents. How to Activate an Agent portion 330 may be selected to display instructions on how to activate an agent shortcut operation.

Instruction portion 340 contains instructions regarding agent activation. Phone number portion 350 allows a user to list a phone number for a phone that may be used for an Agent Activation Device. E-mail portion 360 allows a user to list an address for an e-mail account that may be used as an Agent Activation Device. WAP device portion 370 allows a user to list an address for a WAP device that may be used as an Agent Activation Device. Add New Device portion 380, upon selection, allows a user to add a new Agent Activation Device. When the agent information is added into the system on the Agent Setup Device, the server 135 will be programmed to accept signals from any of the devices having information entered in portions 350, 360 or 370.

Figure 4:
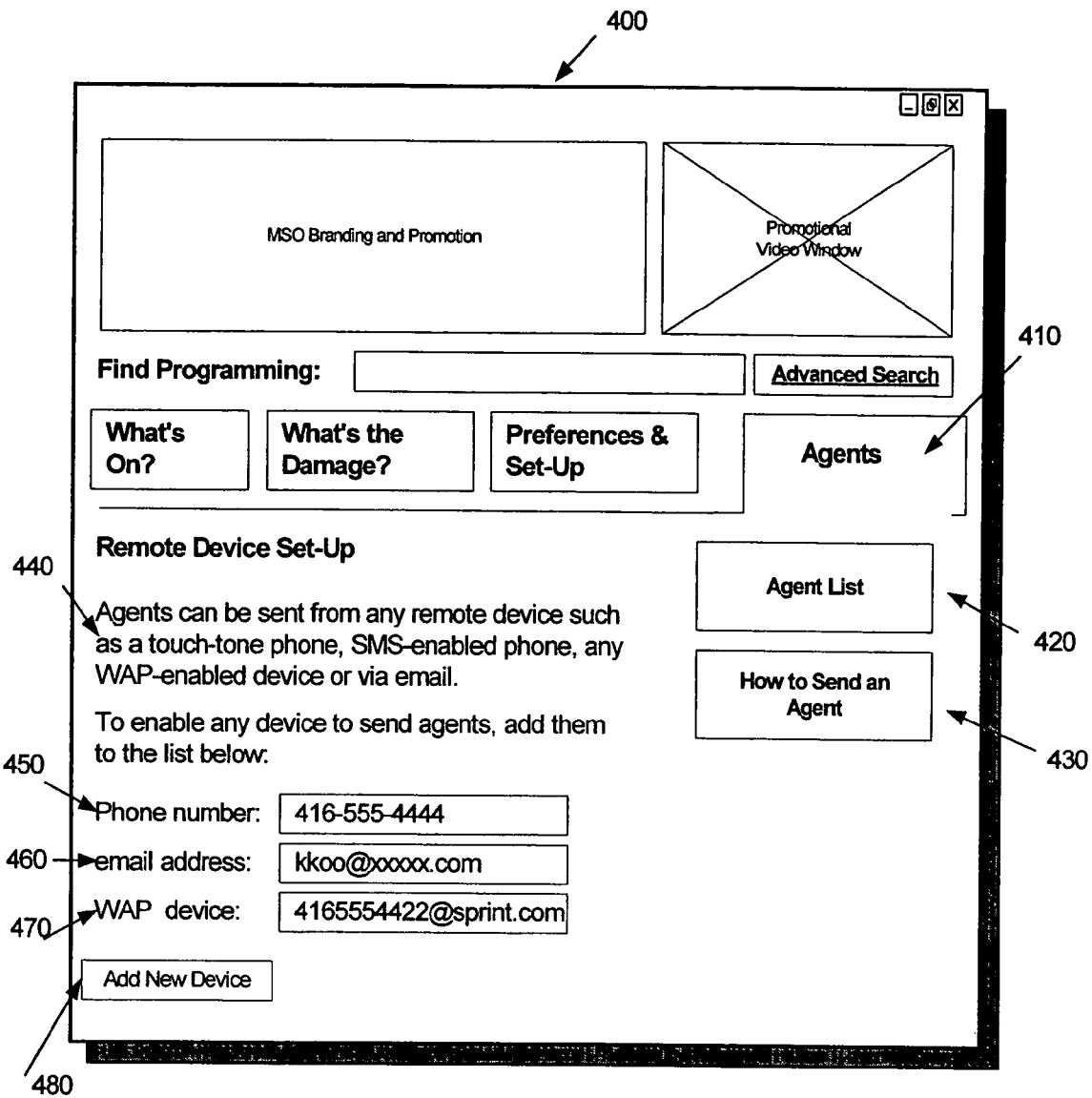
FIG. 4 is a diagram illustrating a screen shot that may be used in accordance with an embodiment of the present invention.

FIG. 4 illustrates a screen shot 400 that may be generated in accordance with the present invention. Agent function portion 420 shows seven different agent shortcut operations, although any number of agent shortcut operations can be used. The agent functions 420 may be set up by the system based on previous selections made by the user, as described in FIG. 2. For example, if the user has previously set one or more parental control levels, the system may automatically set up such agent functions. Alternatively, the user may manually set desired agent functions, such as tuning to a specific channel at a desired time, turning on lights or other electronic devices connected to the network, etc.

The screen shot 400 also includes codes 430. The codes 430 are different for each agent function 420. When the appropriate code 430 is sent by an Agent Activation Device as described above in conjunction with FIG. 3, the appropriate agent functionality will be executed on the Agent-Managed Device, as further described below.

Once the user has set up the Agent Activation Devices as described in conjunction with FIG. 3 and has set up the agent functionality as described above in conjunction with FIG. 2, the system will function to allow the user to activate agent shortcut operations, using one of the Agent Activation Devices. For example, if the user is using a phone or WAP device, the user will dial or enter an access number that will access server 135. If the user is using e-mail, the user will send an email to an e-mail address that accesses the server 135. In either event, all the user must do now is enter or send the appropriate code 430.

The server 135 contains programming that recognizes the Agent Activation Device as belonging to the particular user, recognizes the entered code, and sends a signal to the Agent-Managed Device to execute the agent shortcut operation. The Agent Managed Device then associates the code with the appropriate agent shortcut macro, and causes the desired functionality to be carried out. Once the agent functionality and corresponding codes have been set up by the user, the agent shortcut operations can also be carried out on any Agent Activation Device. For example, specific keys on a television remote control may be programmed as hotkeys for activation of the agent shortcut operations to be executed on a digital set top box. This allows the user to have the added convenience of not having to access additional screens to perform the desired functionality.

Several embodiments of the invention are specifically illustrated and/or described herein. However, it will be appreciated that modifications and variations of the invention are covered by the above teachings and within the purview of the appended claims without departing from the spirit and intended scope of the invention. For example, the screen shots shown herein are only possible screen shots that may be used, and variations thereof may be used in accordance with the invention.

What is claimed is:

1. A method, comprising:
   receiving a selection of an agent shortcut operation from a user on an agent setup device, wherein the agent setup device is a mobile device coupled to a network and residing in a first location, and wherein the selection is received via a graphical user interface associated with a web page; and
   sending the selected agent shortcut operation through the network to an agent activation device residing in a second location, wherein the agent shortcut operation is relayed back through the network and to an electronic device to be available for subsequent activation at a third location in which the electronic device resides.

2. The method of claim 1, wherein the agent setup device is a different device than the electronic device.

3. The method of claim 1, further comprising providing a list of agent shortcut operations to the user on the agent setup device.

4. The method of claim 1, further comprising receiving an indication from the user of an agent activation device that will activate the agent shortcut operation.

5. The method of claim 4, wherein the agent shortcut operation may be remotely activated by the user on the agent activation device by e-mail, by phone, or by using another wireless, wireline, or network protocol.

6. The method of claim 1, further comprising receiving an indication of a code from the user that is used to activate the agent shortcut operation.

7. The method of claim 1, further comprising receiving a selection of a plurality of agent shortcut operations from the user, and sending the agent shortcut operations to the electronic device to be available for subsequent activation.

8. The method of claim 1, wherein the electronic device comprises one of a computer, a set top box, a home alarm, a thermostat, an electronic device controller, a gaming console, a television, a digital video recorder, a phone, a lighting system, or another consumer electronics device.

9. The method of claim 1, wherein receiving a selection of an agent shortcut operation from a user comprises receiving a pre-selected code from the user.

10. The method of claim 1, wherein the electronic device is a set top box of a cable television system.

11. The method of claim 10, wherein the agent shortcut operation enables remote setting of electronic device preferences, such as a parental control level or default language.

12. The method of claim 10, wherein the agent shortcut operation enables remote reminder setting or recording of a desired program.

13. The method of claim 10, wherein the agent shortcut operation enables remote searching for program content.

14. The method of claim 10, wherein the agent shortcut operation enables remote activation of electronic or electrical equipment connected to the set top box.

15. A method, comprising:
   sending an agent shortcut operation to an electronic device, wherein the agent shortcut operation is selected via a graphical user interface associated with a web page;
   receiving an activation signal from an agent activation device for the agent shortcut operation; and
   in response to the received activation signal, sending a signal to the electronic device to activate the agent shortcut operation, wherein the agent activation device and the electronic device reside in different locations.

16. The method of claim 15, wherein the electronic device is a different device than the agent activation device.

17. The method of claim 16, wherein the agent setup device is one of a computer, a phone or a personal data assistant, or another consumer electronics device.

18. The method of claim 15, wherein the activation signal is a pre-selected code.

19. The method of claim 15, wherein the electronic device comprises one of a computer, a set top box, a home alarm, a thermostat, an electronic device controller, a gaming console, a television, a digital video recorder, a phone, a lighting system, or another consumer electronics device.

20. The method of claim 15, wherein the electronic device is a set top box in a cable television system.

21. The method of claim 20, wherein the agent shortcut operation enables remote setting of electronic device preferences, such as a parental control level or default language.

22. The method of claim 20, wherein the agent shortcut operation enables remote reminder setting or recording of a desired program.

23. The method of claim 20, wherein the agent shortcut operation enables remote searching for program content.

24. The method of claim 20, wherein the agent shortcut operation enables remote activation of electronic or electrical equipment connected to the set top box.

25. The method of claim 15, further comprising:
   sending a plurality of agent shortcut operations to the electronic device, each of the agent shortcut operations having a corresponding activation code; and
   sending a signal to activate one of the agent shortcut operations to the electronic device upon receipt of the corresponding activation code.

26. The method of claim 15, further comprising receiving a setup signal from an agent setup device, the setup signal designating what device may act as the agent activation device.

27. The method of claim 26, wherein the setup signal indicates an activation code that upon entry in the agent activation device enables the agent shortcut operation.

28. A system, comprising:
   means for receiving a selection of an agent shortcut operation from a user on an agent setup device, wherein the agent setup device is a mobile device coupled to a network and residing in a first location, and wherein the selection is received via a graphical user interface associated with a web page; and
   means for sending the selected agent shortcut operation through the network to an agent activation device residing in a second location, wherein the agent shortcut operation is relayed back through the network and to an electronic device to be available for subsequent activation at a third location in which the electronic device resides.

29. The system of claim 28, wherein the agent setup device is a different device than the electronic device.

30. The system of claim 29, further comprising means for providing a list of agent shortcut operations to the user on the agent setup device.

31. The system of claim 28, further comprising means for receiving an indication of a code from the user that is used to activate the agent shortcut operation.

32. The system of claim 28, further comprising means for receiving a selection of a plurality of agent shortcut operations from the user, and sending the agent shortcut operations to the electronic device to be available for subsequent activation.

33. The system of claim 28, wherein the electronic device comprises one of a computer, a set top box, a home alarm, a thermostat, an electronic device controller, a gaming console, a television, a digital video recorder, a phone, a lighting system, or another consumer electronics device.

34. The system of claim 28, wherein the means for receiving the designation from the user of at least electronic device comprises means for receiving a designation from the user of a plurality of electronic devices, further comprising sending the selected agent shortcut to the designated plurality of electronic devices.

35. The system of claim 28, wherein the electronic device is a set top box of a cable television system.

36. The system of claim 35, wherein the agent shortcut operation enables remote setting of electronic device preferences, such as parental control level or default language.

37. The system of claim 35, wherein the agent shortcut operation enables remote reminder setting or recording of a desired program.

38. The system of claim 35, wherein the agent shortcut operation enables remote searching for program content.

39. The system of claim 35, wherein the agent shortcut operation enables remote activation of electronic or electrical equipment connected to the set top box.

40. A system, comprising:
means for sending an agent shortcut operation to an electronic device, wherein the agent shortcut operation is selected via a graphical user interface associated with a web page;
means for receiving an activation signal from an agent activation device for the agent shortcut operation; and
means for sending a signal to the electronic device to activate the agent shortcut operation, in response to the received activation signal, wherein the agent activation device and the electronic device reside in different locations.

41. The system of claim 40, wherein the agent activation device is a different device than the electronic device.

42. The system of claim 41, wherein the agent activation device is one of a computer, a phone or a personal data assistant or another electronics device.

43. The system of claim 40, wherein the activation signal is a pre-selected code.

44. The system of claim 40, wherein the electronic device comprises one of a computer, a set top box, a home alarm, a thermostat, an electronic device controller, a gaming console, a television, a digital video recorder, a phone, a lighting system, or another consumer electronic device.

45. The system of claim 40, wherein the electronic device is a set top box in a cable television system.

46. The system of claim 45, wherein the agent shortcut operation enables remote setting of electronic device preferences, such as parental control level or default language.

47. The system of claim 45, wherein the agent shortcut operation enables remote reminder setting or recording of a desired program.

48. The system of claim 45, wherein the agent shortcut operation enables remote searching for program content.

49. The system of claim 45, wherein the agent shortcut operation enables remote activation of electronic or electrical equipment connected to the set top box.

50. The system of claim 40, further comprising:
means for sending a plurality of agent shortcut operations to the electronic device, each of the agent shortcut operations having a corresponding activation code; and
means for sending a signal to activate one of the agent shortcut operations upon receipt of the corresponding activation code.

51. The system of claim 40, further comprising means for receiving a setup signal from an agent setup device, the setup signal designating what device may act as the agent activation device.

52. The system of claim 51, wherein the setup signal indicates an activation code that upon entry in the agent activation device enables the agent shortcut operation.

53. A non-transitory medium having stored thereon a plurality of executable instructions configured for:
receiving a selection of an agent shortcut operation from a user on an agent setup device, wherein the agent setup device is a mobile device coupled to a network and residing in a first location, and wherein the selection is received via a graphical user interface associated with a web page; and
sending the selected agent shortcut operation through the network to an agent activation device residing in a second location, wherein the agent shortcut operation is relayed back through the network and to an electronic device to be available for subsequent activation at a third location in which the electronic device resides.

54. A non-transitory medium having stored thereon a plurality of executable instructions configured for:
sending an agent shortcut operation to an electronic device, wherein the agent shortcut operation is selected via a graphical user interface associated with a web page;
receiving an activation signal from an agent activation device for the agent shortcut operation; and
in response to the received activation signal, sending a signal to the electronic device to activate the agent shortcut operation, wherein the agent activation device and the electronic device reside in different locations.

* * * * *